United States Patent [19]

Sherwood et al.

[11] Patent Number: 5,078,891

[45] Date of Patent: Jan. 7, 1992

[54] METHOD OF CONTROLLING SILICA DEPOSITION IN AQUEOUS SYSTEMS

[75] Inventors: Steven P. Sherwood, The Woodlands; Truc K. Nguyen, Houston; Cato R. McDaniel, The Woodlands, all of Tex.

[73] Assignee: Betz Laboratories, Inc., Trevose, Pa.

[21] Appl. No.: 490,207

[22] Filed: Mar. 8, 1990

[51] Int. Cl.$^5$ .............................. C02F 1/00; C02F 5/10
[52] U.S. Cl. .................................. 210/6.99; 210/700; 252/180; 252/181; 422/15
[58] Field of Search ...................... 252/180, 181, 384.2, 252/389.24, 395; 210/697, 698, 699, 700, 701; 422/15, 17, 18, 19

[56] References Cited

U.S. PATENT DOCUMENTS

| | | | |
|---|---|---|---|
| 3,578,589 | 5/1971 | Hwa et al. | 210/58 |
| 3,948,792 | 4/1976 | Watson et al. | 252/181 |
| 4,497,713 | 2/1985 | Geiger | 210/699 |
| 4,618,448 | 10/1986 | Cha et al. | 252/180 |
| 4,659,481 | 4/1987 | Chen | 210/697 |
| 4,732,698 | 3/1988 | Chen | 252/181 |
| 4,869,845 | 9/1989 | Chen | 252/181 |
| 4,900,451 | 2/1990 | Brown et al. | 210/699 |

Primary Examiner—Prince Willis, Jr.
Assistant Examiner—J. Silbermann
Attorney, Agent, or Firm—Alexander D. Ricci; Gregory M. Hill

[57] ABSTRACT

A method for the inhibition of silica deposition on the internal surfaces of an aqueous system comprising adding to the aqueous system a phosphonate compound and a water soluble polymer having the structure:

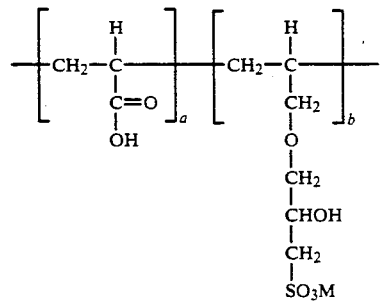

wherein M is a water soluble cation. The aqueous systems in which the water soluble phosphonate and polymer are particularly effective on cooling water and boiler systems.

7 Claims, No Drawings

METHOD OF CONTROLLING SILICA DEPOSITION IN AQUEOUS SYSTEMS

FIELD OF THE INVENTION

The present invention relates to cooling and boiler water systems. The control of silica deposition within these systems is the focus of the invention disclosed hereinafter.

BACKGROUND OF THE INVENTION

The problems of scale formation and its attendant effects have troubled water systems for years. For instance, scale tends to accumulate on internal walls of various water systems, such as boiler and cooling systems, thereby materially lessening the operational efficiency of the system.

One particular type of deposit, silica, has proven to be especially troublesome. This invention is directed toward those water systems where silica deposition is most problematic.

In cooling water systems, silica forms a deposit on the metal surfaces which contact the water flowing through the system. In this manner, heat transfer efficiency becomes severely impeded. This, in turn has a deliterious effect on the overall operating efficiency of the cooling water system.

Although steam generating systems are somewhat different from cooling water systems, they share a common problem in regard to deposit formation. As detailed in the Betz Handbook of Industrial Water Conditioning, 8th Edition, 1980, Betz Laboratories, Inc., Trevose, Pa. Pages 85-96, the formation of scale and sludge deposits on boiler heating surfaces is a serious problem encountered in steam generation. Although current industrial steam producing systems make use of sophisticated external treatments of the boiler feedwater, e.g., coagulation, filtration, softening of water prior to its feed into the boiler system, these operations are only moderately effective. In all cases, external treatment does not in itself provide adequate treatment since muds, sludge, silts and hardness-imparting ions, such as silica, escape the treatment, and eventually are introduced into the steam generating system. As is obvious, the deposition of silica on the structural parts of a steam generating system causes poorer circulation and lower heat transfer capacity, resulting accordingly in an overall loss in efficiency.

Various methods have been utilized for resolving the problem of sludge and silt, including silica, deposition. In U.S. Pat. No. 3,578,589, Hwa et al., inhibition of scale, mud, silt and sludge deposition is achieved by adding a nonionic surface active agent, such as a polyethyleneoxy alkyl phenol, and a water soluble polymer, such as polyacrylic acid.

In Watsen et al., U.S. Pat. No. 3,948,792, the patentees disclose the problem of silicate scale formation in automobile and diesel coolant systems. They teach adding a water soluble carboxylic acid polymer along with boric acid, or borates, and nitrites.

U. S. Pat. No. 4,869,845, Chen, utilizes the same copolymer as utilized in the present invention to treat scale and corrosion problems in cooling and boiler water systems. The copolymer is added to the system with both a phosphonate and a zinc compound. The purpose of the copolymer is to maintain the solubility of zinc. Without this mechanism, the zinc would precipitate in the form of zinc hydroxide and would be unavailable for its desired anti-corrosion activity.

DETAILED DESCRIPTION OF THE INVENTION

In accordance with the invention, it has been discovered that the water soluble copolymers, as shown in Formula I hereinafter, are effective in controlling the formation of silica deposits in various water systems.

FORMULA I

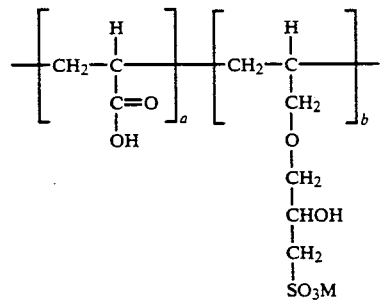

wherein M is a water soluble cation. This polymer is referred to as acrylic acid/allyl hydroxy propyl sulfonate ether (AA/AHPSE). The IUPAC nomenclature for AHPSE is 1-propane sulfonic acid, 2-hydroxy-3-(2 propenyl-oxy) mono sodium salt.

The number average molecular weight of the water soluble copolymers of FORMULA I may fall within the range of 1,000 to 1,000,000. Preferably the number average molecular weight will be within the range of from about 1,500 to about 10,000 being even more highly desirable. The key criterion is that the polymer be water soluble.

The molar ratio a:b of the monomers of FORMULA I may fall within the range of between about 30:1 to 1:20, with the a:b molar ratio range of from about 10:1 to 1:5 being preferred.

With respect to both repeat units of the polymers of the present invention, they may exist in acid or water soluble salt form when used in the desired water system.

As to preparation of the monomer designated as a above, in FORMULA I, acrylic acid is well known. It may be produced by hydrolysis of acrylonitrile or via oxidation of acrolein. Other well known vinyl containing monomers such as methacrylic acid and acrylamide may also be utilized as monomer a of FORMULA I in accordance with the invention.

Turning to the allyl containing monomer, monomer b, in FORMULA I above, it may be produced by reacting allyl alcohol with a non-tertiary alcohol in the temperature range of about 25°-150°C. as detailed in U.S. Pat. No. 2,847,477 (the entire disclosure of which is hereby incorporated by reference) followed by, if desired, sulfonation, phosphorylation, phosphonation or carboxylation of the monomer via well-known techniques.

The preferred allyl hydroxyl propyl sulfonate ether monomers (monomer b, FORMULA II) may conveniently be prepared via a ring opening reaction of the epoxy group of an allyl glycidyl ether precursor. Sulfonation of the epoxy group with sodium sulfite in the presence of a phase transfer catalyst such as tetra-n-butyl ammonium bisulfite or with fuming sulfuric acid containing sulfur trioxide will produce the sulfonic acid group and hydroxy group of the AHPSE. The resulting monomer can be further neutralized with caustic or other basic material. The reaction is illustrated by the following mechanism:

$$CH_2=C-CH_2-O-CH_2-\overset{H}{\underset{|}{C}}\diagdown\overset{}{\underset{O}{\diagup}}CH_2 + SO_3 \xrightarrow{NaOH}$$

$$CH_2=C-CH_2-O-CH_2-CHOH---CH_2-SO_3^-Na^+$$

It should be noted that monomer b may itself be allyl glycidyl ether which is commercially available from several sources. Suitable cations include $Na+$, $NH_4+$, $Ca+^2$ and $K+$.

After the desired monomers have been obtained, free radical chain addition polymerization may proceed in accordance with conventional solution polymerization techniques. Polymerization initiators such as persulfate initiators, peroxide initiators, etc. may be used. Preferably the requisite monomers are mixed with water and alcohol (preferably isopropanol). The resulting polymer may be isolated by well-known methods such as distillation, etc. or the polymer may simply be used in its aqueous solution.

It should be mentioned that water soluble terpolymers comprising monomers a and b of FORMULAE I or II may also be prepared for use as deposit control agents and/or corrosion control agents. For instance, AHPSE monomers may be incorporated into a water soluble terpolymer backbone having other repeat units including acrylic acid monomers, alkyl acrylate monomers, methacrylic acid monomers, acrylamide monomers, etc.

The polymers are added to the aqueous system for which corrosion inhibiting and/or deposit control activity is desired, in an amount effective for the purpose. This amount will vary depending upon the particular system for which treatment is desired and will be influenced by factors such as, the area subject to corrosion, pH, temperature, water quantity and the respective concentrations in the water of the potential scale and deposit forming species. For the most part, the polymers will be effective when used at levels of about 0.1–500 parts per million parts of water, and preferably from about 1.0 to 100 parts per million of water in the system to be treated.

The water soluble polymers of the present invention are also used with topping agents useful to enhance the inhibition of silica deposition. Topping agents found to be particularly effective are phosphonates. They may be added to the aqueous system in an amount of from 1 to about 500 ppm. Preferably, the range is between 1 and about 100 ppm.

Examples of preferred phosphonates are phosphonic acids. Those utilized in the present invention include:
hydroxyethylidene diphosphonic acid (HEDP), Monsanto Dequest 2010
2-phosphonobutane-1,2,4 - tricarboxylic acid (PBSAM), Mobay Bayhibit AM
hydroxypropylidene diphosphonic acid (HPDP), Betz Laboratories, Inc.
hydroxybutylidene diphosphonic acid (HBDP), Betz Laboratories, Inc.
hydroxyisobutylidene diphosphonic acid (HIBDP), Betz Laboratories, Inc.
aminotri(methylenephosphonic acid) (AMP), Monsanto Dequest 2000
hydroxyphosphonocarboxylic acid (Belcor 575), Ciba Geigy
diethylene triamo-penta (methylene phosphonic acid), (Dequest 2060) Monsanto The water soluble polymer of the invention may be added to the aqueous system either continuously or intermittently. It may be blended with the chosen phosphonate prior to addition to the system or, alternatively, both compounds may be added separately. The phosphonates acid compound may also be added either continuously or intermittently as conditions require, in order to maintain the necessary concentrations.

EXAMPLES

Testing was conducted with Bench Top Recirculators which were operated in batch configuration with no makeup or blowdown streams. Treatment efficacy was determined from the appearance of the stainless steel heat transfer surface, and turbidity of recirculating water after 48 hours. Sump turbidity is measured in standard NTU units which were derived from analysis with a conventional turbidimeter.

Test Conditions pH: 9.0
sump Temperature: 120 Deg. F.
Flow Rate: 3.0 GPM
Velocity Across Heat Transfer Surface: 2.1 Ft/Sec
Heat Flux through a Stainless Steel Tube: 15,600 BTU/ft*ft*Hr
Sump Volume: 12 Liters

Water Matrix $Ca+^2$: 200 ppm as $CaCO_3$
$Mg+^2$: 200 ppm as $CaCO_3$
$SiO_2$: 200 ppm
$NaHCO_3$: 225 ppm Table I exhibits test results using an acrylic acid/allylhydroxypropyl-sulfonate ether copolymer, having a 3/1 monomer mole ratio and a high molecular weight, in combination with various phosphonates.

TABLE I

| POLYMER/PHOSPHONATE BLENDS | | | |
|---|---|---|---|
| Concentration (ppm) | Treatment Blend | Deposition Tube Deposit | Sump Turbidity (NTUs) |
| (HEDP Blends) | polymer/HEDP | | |
| 50/2.5 | polymer/HEDP | None | 23 |
| 50/2.5 | polymer/HEDP | Hazy | 36 |
| 50/2.5 | polymer/HEDP | V.L. | 30 |
| 50/1 | polymer/HEDP | Mod. | 47 |
| 50/5 | polymer/HEDP | Light | 26 |
| 50/10 | polymer/HEDP | Mod. | 31 |
| 40/2 | polymer/HEDP | Mod. | 32 |
| 25/2.5 | polymer/HEDP | Mod. | 50 |
| 12.5/2.5 | polymer/HEDP | Heavy | 22 |
| 100/10 | polymer/HEDP | Light | 44 |
| (PBSAM Blends) | | | |
| 50/2.5 | polymer/PBSAM | Mod. | 53 |
| 50/10 | polymer/PBSAM | Mod. | 19 |
| 100/5 | polymer/PBSAM | V.L. | 36 |
| 100/10 | polymer/PBSAM | V.L. | 38 |
| 100/10 | polymer/PBSAM | V.L. | 34 |
| 100/10 | polymer/PBSAM | V.L. | 36 |
| 50/20 | polymer/PBSAM | Mod. | 30 |
| (Other Phosphonate Blends) | | | |

TABLE I-continued

POLYMER/PHOSPHONATE BLENDS

| Concentration (ppm) | Treatment Blend | Deposition Tube Deposit | Sump Turbidity (NTUs) |
|---|---|---|---|
| 50/2.5 | polymer/HPDP | Mod. | 25 |
| 50/2.5 | polymer/HBDP | Mod. | 22 |
| 50/2.5 | polymer/HIBDP | V.L. | 33 |
| 50/2.5 | polymer/HIBDP R | Mod. | |
| 50/2.5 | polymer/HDP(C-5) | Light | |
| 50/2.5 | polymer/AMP | V.L. | 43 |
| 50/2.5 | polymer/Bel 575 | Mod. | 47 |
| 50/2.5 | polymer/Deq.2060 | Light | |

V.L. = Very Light Deposit
Mod. = Moderate Deposition
polymer: acrylic acid/alkylhydroxypropylsulfonate ether, 3/1 mole ratio The acrylic acid:allylhydroxypropylsulfonate ether polymer/HEDP blend was the only treatment to produce a clean deposition tube. Optimum treatment levels under the given test conditions are 50 ppm polymer and 2.5 ppm HEDP. Changing the treatment level or blend ratio results in increased deposition on the heat transfer surface. PBSAM was less effective then HEDP as evidenced by the moderate deposition on the tube at the 50/2.5 ppm treatment blend ratio. AMP was slightly less effective than HEDP along with HIBDP (hydroxyisobutylidenediphosphonic acid).

The test results of Table I are arranged within Table II in relation to their relative efficacies along with other comparative treatments. Full names for abbreviated compounds not previously defined will be provided following Table II.

TABLE II

| RELATIVE EFFICACIES OF VARIOUS TREATMENTS | |
|---|---|
| Treatment | Concentration Ratio |
| MOST EFFICACIOUS (Clean/Light deposit on tube, High Total SiO$_2$) | |
| AA/AHPSE:HEDP | 50:2.5 ppm |
| AA/AHPSE:PBSAM | 100:5 ppm |
| AA/AHPSE:HIBDP | 50:2.5 ppm |
| AA/AHPSE:AMP | 50:2.5 ppm |
| MODERATELY EFFICACIOUS (Moderate Deposition, Total SiO$_2$ > Reactive SiO$_2$) | |
| AA/AHPSE:HEDP | 50:5 ppm |
| AA/AHPSE:HEDP | 50:1 ppm |
| AA/AHPSE:PBSAM | 50:20 ppm |
| AA/AHPSE:HPDP | 50:2.5 ppm |
| AA/AHPSE:HEDP | 50:10 ppm |
| AA/AHPSE:PESA | 50:50 ppm |
| AA/AHPSE:PBSAM | 50:1 ppm |
| AA/AOP:PBSAM | 100:10 ppm |
| AA/AHPSE:HEDP | 100:10 ppm |
| AA/AAPSE:PBSAM | 50:10 ppm |
| TAMOL 731:AlNH$_4$:HEDP | 50:50:2.5 ppm |
| AMPS/IPPA:AlNH$_4$:HEDP | 50:50:25 ppm |
| LEAST EFFICACIOUS (Heavy Deposition, Total SiO$_2$ = Reactive SiO$_2$) | |
| polyacrylic acid[1] | 50 ppm |
| PESA:AA/AHPSE[2]:PBSAM | 100:50:1 ppm |
| SS/MA:HEDP | 50:2.5 ppm |
| polyacrylic acid:PBSAM | 10:1 ppm |
| PESA:HEDP | 50:2.5 ppm |
| Dowfax 2Al:HEDP | 50:2.5 ppm |
| polyacrylic acid[1]:HEDP | 50:6 ppm |
| PESA:PBSAM | 100:5 ppm |
| polymaleic acid:HEDP | 50:2.5 ppm |
| Ethaquad 18/25:Dequest 2060 | 50:12 ppm |
| Tamol 731:PBSAM | 50:3 ppm |
| AA/APA:HEDP | 50:2.5 ppm |
| AA/AHPSE[2]:PBSAM | 50:1 ppm |
| (NH$_4$)$_2$CO$_3$:PBSAM | 50:10 ppm |
| Borate:HEDP | 100:2.5 ppm |
| PBSAM | 10 ppm |
| AA/AHPSE[3]:PBSAM | 100:10 ppm |
| AA/AHPSE | 50 ppm |
| HEDP | 2.5 ppm |
| AA/AMPS:PBSAM | 100:10 ppm |
| polyacrylic acid[4]:HEDP | 50:2.5 ppm |
| AA/AMPS:HEDP | 50:2.5 ppm |
| AA/AHPSE:HEDP | 12.5:2.5 ppm |
| AMPS/IPPA:HEDP | 50:2.5 ppm |
| PESA | 100 ppm |
| polymethacrylic acid:HEDP | 50:2.5 ppm |
| PVP:HEDP | 50:2.5 ppm |
| PVA:HEDP | 50:2.5 ppm |

[1]MW = @ 10,000
[2]3:1 mole ratio, low molecular weight
[3]6:1 mole ratio
[4]MW = @ 2,200
PESA: poly(succinic acid ether)
SS/MA: sulfonated styrene/maleic acid
Dowfax 2Al: oxybis (dodecylbenzenesulfonic acid)
Ethaquad 18/25: methylpolyoxyethylene(15)octadecylammonium chloride
Tamol 731: copolymer of maleic acid and diisobutylene
AA/APA: copolymer of acrylic acid and alkylphosphonic acid
Borate: boric acid/lignin/polysaccharide
AMPS/IPPA: copolymer of 2-acrylamide-2-methylpropylsulfonic acid and isopropanyl phosphonic acid
PVP: polyvinyl pyrrolidone
PVA: polyvinyl alcohol The foregoing data clearly demonstrate the value of the AA/AHPSE copolymer, 3/1 mole ratio, along with various phosphonates to control the deposition of silica in aqueous systems. The specific concentrations of the chemical constituents may be varied in order to optimize treatment efficacy. System parameters such as the pH level, water temperature, flowrate and silica and other mineral contents affect the function of the treatment chemicals. It may therefore be necessary for the water system operator to vary the concentration levels of the treatment chemicals within the preferred ranges in order to effect the greatest possible silica deposit inhibition.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method for inhibiting the deposition of silica containing material on the inner surfaces of the containment means of an aqueous medium consisting essentially of adding to said aqueous medium from about 2.5 to 5.0 parts per million parts of said aqueous medium of a water soluble phosphonate selected from the group consisting of:

hydroxyethylidenediphoshonic acid,
2-phosphonobutane-1,2,4-tricarboxylic acid,
hydroxyisobutylidene diphosphonic acid, and
aminotri (methylenephosphonic) acid, and from about 50 to 100 parts per million parts of said aqueous medium of a water soluble polymer having repeat units (a) and (b) comprising the structure:

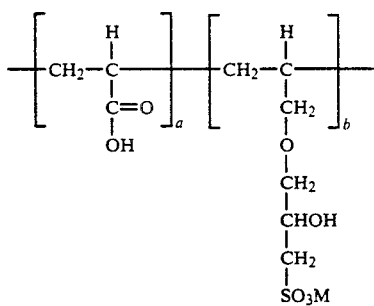

wherein M is a water soluble cation, the molar ratio of said repeat units a:b is about 3:1 and the number average molecular weight of said polymer is between 1,000 and 1,000,000.

2. The method according to claim 1 wherein the number average molecular weight of said polymer is between 1,500 and 500,000.

3. The method according to claim 1 wherein the number average molecular weight of said polymer is between 1,500 and 10,000.

4. The method according to claim 1 wherein said phosphonate is hydroxyethylidene diphosphonic acid.

5. The method according to claim 1 wherein said phosphonate is 2-phosphonobutane-1,2,4-tricarboxylic acid.

6. The method according to claim 1 wherein said aqueous medium is a cooling water system.

7. The method according to claim 1 wherein said aqueous medium is a boiler water system.

* * * * *